C. J. SOLEAU.
COMBINED BICYCLE RACK AND LOCK.
APPLICATION FILED JUNE 3, 1916.
1,202,444.
Patented Oct. 24, 1916.
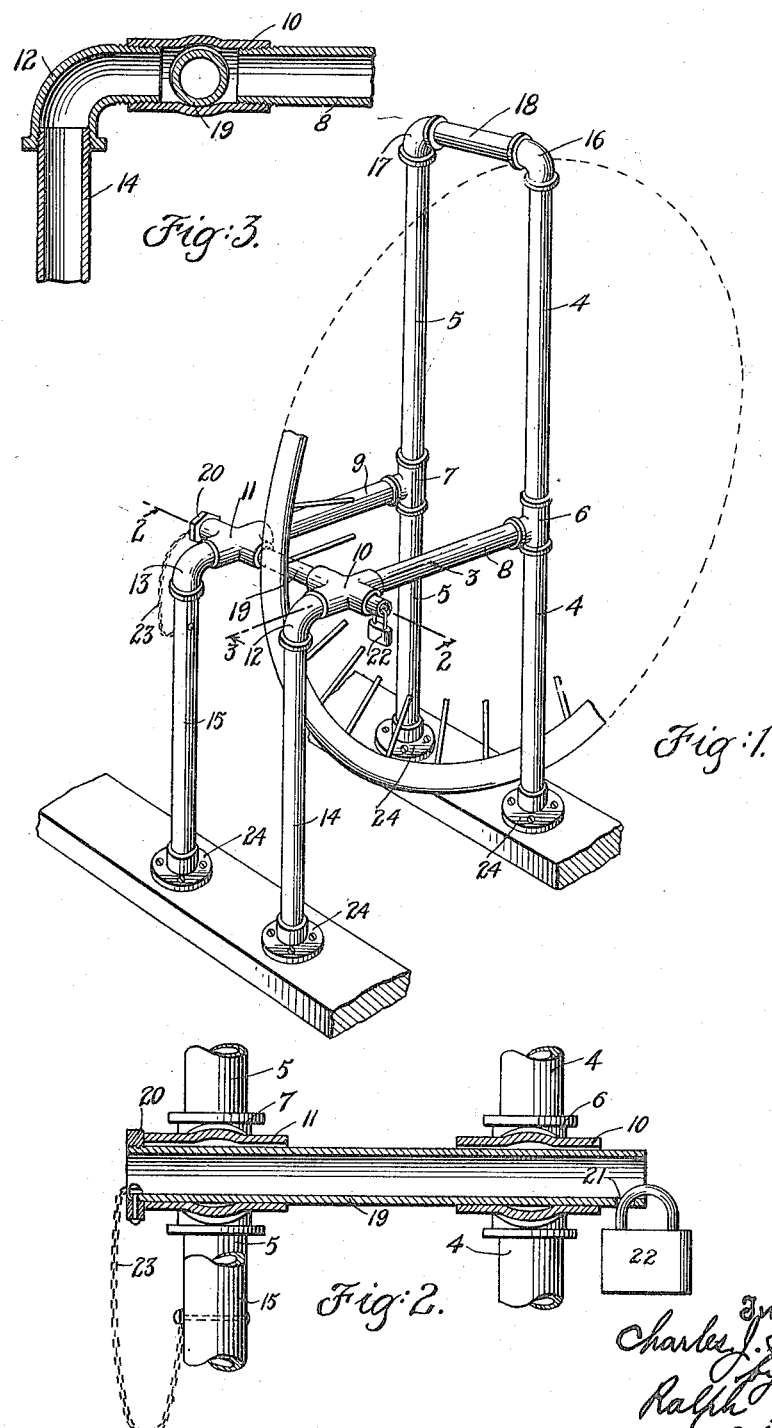

UNITED STATES PATENT OFFICE.

CHARLES J. SOLEAU, OF MONTCLAIR, NEW JERSEY.

COMBINED BICYCLE RACK AND LOCK.

1,202,444.  Specification of Letters Patent.  Patented Oct. 24, 1916.

Application filed June 3, 1916. Serial No. 101,506.

*To all whom it may concern:*

Be it known that I, CHARLES J. SOLEAU, a citizen of the United States, and a resident of Montclair, in the county of Essex and State of New Jersey, have invented certain new and useful Improvements in Combined Bicycle Racks and Locks, of which the following is a specification.

My invention relates to combined bicycle racks and locks designed to receive a wheel of a bicycle and support the same in an upright position, and also to lock the wheel to or within the rack so that the bicycle cannot be removed therefrom by unauthorized persons; and the objects of my invention are to provide an improved bicycle rack and lock which may be made from ordinary piping and commercial forms of pipe fittings readily obtainable in the open market; to provide such a device with improved locking mechanism more difficult to break, or to unlock by unauthorized persons, than has heretofore been the case in similar devices; to provide a device of the class referred to which will be simple in construction and extremely strong, easy to manufacture from readily obtainable material and parts, and effective for the purpose which it is intended to serve; and to otherwise improve upon and enhance the efficiency of combined bicycle racks and locks of the general type above mentioned and to which my invention belongs.

With the above and other objects of invention in view, my invention consists in the improved combined bicycle rack and lock illustrated in the accompanying drawing, described in the following specification, and particularly claimed, and in such variations and modifications thereof, within the scope of the claims, as will be obvious to those skilled in the art to which my invention relates.

In the drawing accompanying and forming a part of this application, and wherein the preferred embodiment of my invention is illustrated; Figure 1 is a view showing my invention in perspective, and illustrating the manner in which a bicycle wheel is supported in an upright position and locked within the rack: Fig. 2 is a fragmentary view showing a section taken upon a vertical plane indicated by the line 2—2, Fig. 1, and Fig. 3 is a similar view taken upon a vertical plane at right angles to the plane of Fig. 2, and along the line 3—3, Fig. 1.

Referring to the drawing, the reference numerals 4, 5, designate two upright members spaced apart from one another and between which the front or rear wheel of a bicycle may be placed, as shown, and which members serve to keep the bicycle in an upright position. These supporting members may be each formed from a single piece of ordinary iron pipe, or from two separate pieces, according to the manner in which joint members intermediate the ends of said upright members and designated by the reference numerals 6, 7, are formed; that is, if the said joint members are in the form of ordinary T pipe fittings each upright will be made up of two separate pieces, whereas if the joint members are cast about the uprights in accordance with manufacturing processes common, for example, in the art of making iron bedsteads and similar devices, the uprights will then preferably each comprise a single piece. The uprights are connected with one another at their upper ends in any way, preferably, however, by means of ordinary L pipe couplings 16, 17, and an intermediate connecting piece 18, or by means of joint members cast about the upper ends of the upright members and the ends of the connecting piece 18 if desired.

The reference numerals 14, 15, designate two vertically extending brace members; and the reference numerals 10, 11 designate two cross members supported between the upper ends of said brace members and the upright members; each cross member being connected with a brace member and also with an upright member, as shown. The cross members are preferably ordinary "cross" pipe fittings, and the connection between the upper ends of the brace members and one branch of these cross members may conveniently be provided by means of connecting members in the form of ordinary L fittings 12, 13, in threaded engagement with the brace and cross members, as shown in Fig. 3, or by means of cast joints if deemed preferable. The inner or right hand ends of the cross members 10, 11, are shown as connected with the upright members by means of horizontally extending members 8, 9, formed preferably from iron pipe and the ends of which are connected, respectively, with the cross members and the point members 6, 7, above referred to, either by threaded connections or by the binding action of the cast metal joints if such forms of joint are employed.

It will be understood from the premises that the method of forming the joints between the several parts which form my improved bicycle rack and lock is of secondary importance, and may be varied, although I prefer to employ ordinary commercial pipe fittings of appropriate form for this purpose; and it will also be appreciated that the appearance of the device, so far as Fig. 1 is concerned, may be the same whatever method or form of joint is employed for securing the several parts together.

The cross members 10, 11, are provided each with an opening, which openings are arranged in alinement with one another as best shown in Fig. 2; and the reference numeral 19 designates a locking bar extending through both said openings and having means for locking it in place after it has been passed between the spokes of a bicycle wheel in the manner illustrated in Fig. 1, whereby the bicycle will be held in an upright position and locked within the rack, as will be understood. In the preferred embodiment of my invention shown, the openings in the cross members are circular in cross section, and the locking bar is shown as comprising a piece of pipe circular in cross section and somewhat smaller than the openings so as to fit quite loosely within and to rotate freely in said openings. This locking bar is provided with a flange 20 at one end, and a hole 21 at the other designed to receive the hasp of an ordinary pad-lock 22, whereby the locking bar may be locked in place as will be appreciated.

The locking bar is made appreciably smaller than the openings in the cross members in order to permit the same to be readily passed through both openings as shown, even though the openings should be somewhat out of alinement; in order that said bar may be easily rotated to bring the hole 21 into such a position that the hasp of the pad-lock may be conveniently inserted thereinto and the pad-lock easily applied and removed; and in order to provide a construction in which it will be practically impossible to break or to materially injure the locking members, it being obvious that it would be very difficult to prevent the locking bar from rotating, as would be necessary in order to saw it apart, or to saw the hasp of the lock, or as would be necessary in order to pry the pad-lock off as by means of a bar or lever.

A chain 23, the ends of which are connected with the end of the locking bar opposite the pad-lock and with one of the vertically extending brace members in the form of my invention illustrated, is commonly provided in order to prevent the locking bar from being moved entirely out of the opening in the cross member 11; and suitable means such, for example, as base members or floor plates 24 are provided at the lower ends of the upright and base members whereby the device as a whole may be secured to a floor or suitable support.

Having thus described and explained my invention, I claim and desire to secure by Letters Patent:—

1. A combined bicycle rack and lock comprising spaced upright members 4, 5, connected with one another at their upper ends; horizontally extending members 8, 9, connected with said upright members intermediate their ends; cross members 10, 11, connected with said horizontally extending members and having each an opening and which openings are disposed in alinement with one another; vertically arranged brace members 14, 15, connected with said cross members at their upper ends; base pieces whereby the lower ends of said upright and brace members may be secured to a suitable support; a locking bar extending through the openings aforesaid in said cross members; and means for locking said locking bar.

2. A combined bicycle rack and lock comprising spaced upright members 4, 5, connected with one another at their upper ends; horizontally extending members 8, 9, connected with said upright members intermediate the ends of said upright members; cross members 10, 11, connected with said horizontally extending members and having each an opening circular in cross-section, and which openings are arranged in alinement with one another; vertically arranged brace members 14, 15, the upper ends of which are connected with said cross members; bases located at the lower ends of said upright and brace members; a freely rotatable locking bar circular in cross-section extending through the openings aforesaid in said cross members; and means for locking said locking bar.

3. A combined bicycle rack and lock comprising spaced members 4, 5, having each a base piece at its lower end; vertically extending brace members 14, 15, having each a base piece at its lower end, and which brace members are shorter than said upright members; cross members 10, 11, having each an opening circular in cross-section, and which openings are arranged in alinement with one another; means whereby said cross members are connected one with the upper end of one of said brace members and with one of said upright members, and the other with the upper end of the other of said brace members and with the other of said upright members; a freely rotatable locking bar circular in cross section extending through the openings aforesaid in said cross members; and means for locking said locking bar.

4. A combined bicycle rack and lock comprising spaced upright members 4, 5; means for securing the lower ends of said upright members to a suitable support; vertically extending brace members 14, 15; means for securing the lower ends of said brace members to a suitable support; cross members 10, 11, having each an opening circular in cross-section, and which openings are arranged in alinement with one another; means whereby said cross members are supported and held in place one between the upper end of one of said brace members and one of said upright members, and the other between the upper end of the other of said brace members and the other of said upright members; and a hollow locking bar circular in cross section extending through the openings aforesaid in said cross members and having a flange at one end, and a hole adjacent the other end adapted to receive the hasp of a pad-lock.

5. A combined bicycle rack and lock comprising spaced upright members 4, 5, connected with one another at their upper ends; joint members 6, 7, intermediate the ends of said upright members; horizontal bars 8, 9, connected with said joint members; cross members 10, 11, connected with said horizontal bars and having each an opening circular in cross-section, and which openings are disposed in alinement with one another; connecting members 12, 13, connected with said cross members; vertically arranged brace members 14, 15, connected with said connecting members at their upper ends; base pieces at the lower ends of said upright and base members; and a hollow locking bar circular in cross section extending through the openings aforesaid in said cross members and having a flange at one end, and a hole adjacent the other end adaptad to receive the hasp of a pad-lock.

In testimony whereof I have signed my name to this specification this 1st day of June, 1916.

CHARLES J. SOLEAU.

Copies of this patent may be obtained for five cents each, by addressing the "Commissioner of Patents. Washington, D. C."